US008190550B2

(12) United States Patent  
Bouchard et al.

(10) Patent No.: US 8,190,550 B2  
(45) Date of Patent: May 29, 2012

(54) SPLIT VARIATIONAL INFERENCE

(75) Inventors: Guillaume M. Bouchard, Crolles (FR); Onno Zoeter, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 566 days.

(21) Appl. No.: 12/481,802

(22) Filed: Jun. 10, 2009

(65) Prior Publication Data

US 2010/0318490 A1      Dec. 16, 2010

(51) Int. Cl.
G06F 17/10      (2006.01)
G06F 17/17      (2006.01)
G06F 17/18      (2006.01)
(52) U.S. Cl. .................. 706/52; 706/17; 706/20
(58) Field of Classification Search ............. 706/52
See application file for complete search history.

(56) References Cited

OTHER PUBLICATIONS

Jordan et al., "An Introduction to Variational Methods for Graphical Models", 1999.*
Jaakkola et al., "Improving the Mean Field Approximation Via the Use of Mixture Distributions", 1999.*
Neal, "Annealed importance sampling", 2000.*
Jaakkola et al., "A variational approach to Bayesian logistic regression models and their extensions," Proceedings of the Sixth International Workshop on Artificial Intelligence and Statistics, Nov. 2, 1996.
Jaakkola et al., "Computing upper and lower bounds on likelihoods in intractable networks," Proceedings of the Twelfth Conference on Uncertainty in AI (1996).
Minka, "Divergence measures and message passing," Microsoft Research Ltd., UK Dec. 7, 2005.
Minka, "Expectation Propagation for Approximate Bayesian Inference," Proceedings of the 17th Annual Conference on Uncertainty in Artificial Intelligence, UAI (2001).
Neal, "Annealed importance sampling," Statistics and Computing, 11, 125-139 (2001).
Wikipedia, "Bayesian inference," at http://en.wikipedia.org/wiki/Bayesian_inference, last visited on May 20, 2009.
Wikipedia, "Optimal control," at http://en.wikipedia.org/wiki/Optimal_control, last visited on May 20, 2009.
Jordan et al., "An Introduction to Variational Methods for Graphical Models," Machine Learning, 37, pp. 183-233 (1999).
Frey et al., "A Revolution: Belief Propagation in Graphs with Cycles," Neural Information Processing Systems Conference, Denver, Colorado, Dec. 1997.
Bishop et al., "Approximating Posterior Distributions in Belief Networks Using Mixtures," Advances in Neural Information Processing Systems, (1998).
Jaakkola et al., "Improving the Mean Field Approximation Via the Use of Mixture Distributions," Kluwer Academic Publishers, (1999).
Beal et al., "The Variational Bayesian EM Algorithm for Incomplete Data: with Application to Scoring Graphical Model Structures," Oxford University Press (2003).

* cited by examiner

*Primary Examiner* — Alan Chen
*Assistant Examiner* — Nathan Brown, Jr.
(74) *Attorney, Agent, or Firm* — Fay Sharpe LLP (57) ABSTRACT

A method comprises: partitioning a region of interest into a plurality of soft bin regions that span the region of interest; estimating an integral over each soft bin region of a function defined over the region of interest; and outputting a value equal to or derived from the sum of the estimated integrals over the soft bin regions spanning the region of interest. The method may further comprise: integrating a Bayesian theorem function using the partitioning, estimating, and outputting operations, and classifying an object to be classified using a classifier trained using the Bayesian machine learning. The method may further comprise performing optimal control by iteratively minimizing a controlled system cost function to determine optimized control inputs using the partitioning, estimating, and outputting with the function equal to the controlled system cost function having the selected control inputs, and controlling the controlled system using the optimized control inputs.

21 Claims, 5 Drawing Sheets

SPLIT VARIATIONAL INFERENCE

BACKGROUND

The following relates to the information processing arts, computational arts, inference arts, and related arts.

Numerous applications entail inference based on integration over probabilistic information. For example, optimal control systems use integration over possible (i.e., probabilistic) responses of a controlled system to a control input in order to estimate system response to the control input. Bayesian inference systems integrate a hypothesis probability density function over accumulating evidence in order to refine the hypothesis. Bayesian inference is used for classification systems and diverse predictive systems and other systems that process uncertain information.

In the case of multidimensional data, such integrals often cannot be computed analytically. Moreover, conventional numerical integration techniques such as Riemann sums can be computationally impractical for high-dimensionality integrals used in control systems or other real-time or otherwise time-constrained systems employing inference engines.

Approximate integration solutions have been developed, such as the mean field approximation. In these approximate integration solutions, the function to be integrated is approximated by a more tractable function that can be analytically integrated. These approaches rely upon the more tractable function being a satisfactory approximation to the actual function to be integrated. In many applications, the function to be integrated may be multimodal or otherwise complex, with the detailed topology, number and position of modes, or other complexity of the function being unknown and not readily estimated. In such applications, the accuracy of the approximate integration is not known a priori, and may be poor (indeed, arbitrarily poor) in certain instances. Such integration solutions with variable and potentially poor accuracy are not well suited for use in task-critical applications such as optimal control or Bayesian inference.

BRIEF DESCRIPTION

In some illustrative embodiments disclosed as illustrative examples herein, a method comprises: partitioning a region of interest into a plurality of soft bin regions that span the region of interest; estimating an integral over each soft bin region of a function defined over the region of interest; and outputting a value equal to or derived from the sum of the estimated integrals over the soft bin regions spanning the region of interest.

In some illustrative embodiments disclosed as illustrative examples herein, a method comprises: performing Bayesian machine learning by integrating a Bayesian theorem function using the partitioning, estimating, and outputting operations set forth in the immediately preceding paragraph in order to compute a normalizing factor wherein the outputting operation outputs an updated hypothesis probability density function; and classifying an object to be classified using a classifier employing the updated hypothesis probability density function. In some illustrative embodiments disclosed as illustrative examples herein, a method comprises: constructing for a controlled system a controlled system cost function including control inputs and an integral over time; iteratively minimizing the controlled system cost function to determine optimized control inputs, the iterative minimizing including evaluating the controlled system cost function for selected control inputs over the time interval of interest by performing the partitioning, estimating, and outputting operations of the immediately preceding paragraph with the function equal to the controlled system cost function having the selected control inputs; and controlling the controlled system using the optimized control inputs. In some illustrative embodiments disclosed as illustrative examples herein, a digital processor is programmed to perform a method as set forth in the immediately preceding paragraph. In some illustrative embodiments disclosed as illustrative examples herein, a storage medium stores instructions executable by a computer to perform a method as set forth in the immediately preceding paragraph. In some illustrative embodiments disclosed as illustrative examples herein, a storage medium stores a library of computer executable library subroutines or library functions including an integration library function configured to receive a function and a region of interest and to perform a method as set forth in the immediately preceding paragraph to generate the output of the integration library function In some illustrative embodiments disclosed as illustrative examples herein, a digital system comprises a digital processor configured to: partition a region of interest into a plurality of soft bin regions that span the region of interest; estimate an integral over each soft bin region of a function defined over the region of interest; iteratively increase the number of soft bin regions and repeat the estimating over the increased number of soft bins until a stopping criterion is met; and responsive to meeting the stopping criterion, output a value equal to or derived from the sum of the estimated integrals over the soft bin regions spanning the region of interest.

In some illustrative embodiments disclosed as illustrative examples herein, the digital processor of the immediately preceding paragraph is further configured to: perform Bayesian machine learning using the partition, estimate, iterative increase and repeat, and output operations to integrate a Bayesian theorem function; and classify an object to be classified using a classifier employing a hypothesis probability density function generated by the Bayesian machine learning. In some illustrative embodiments disclosed as illustrative examples herein, the digital processor of the immediately preceding paragraph is further configured to: construct for a controlled system a controlled system cost function including control inputs and an integral over time; iteratively minimize the controlled system cost function to determine optimized control inputs, the iterative minimizing including evaluating the controlled system cost function for selected control inputs over the time interval of interest using the partition, estimate, iterative and repeat, and output operations; and control the controlled system using the optimized control inputs

DETAILED DESCRIPTION

In the following, the terms "optimization", "minimization", and similar phraseology are to be broadly construed as one of ordinary skill in the art would understand these terms. For example, these terms are not to be construed as being limited to the absolute global optimum value, absolute global minimum, or so forth. For example, minimization of a function may employ an iterative minimization algorithm that terminates at a stopping criterion before an absolute minimum is reached. It is also contemplated for the optimum or minimum value to be a local optimum or local minimum value.

Figure 1:
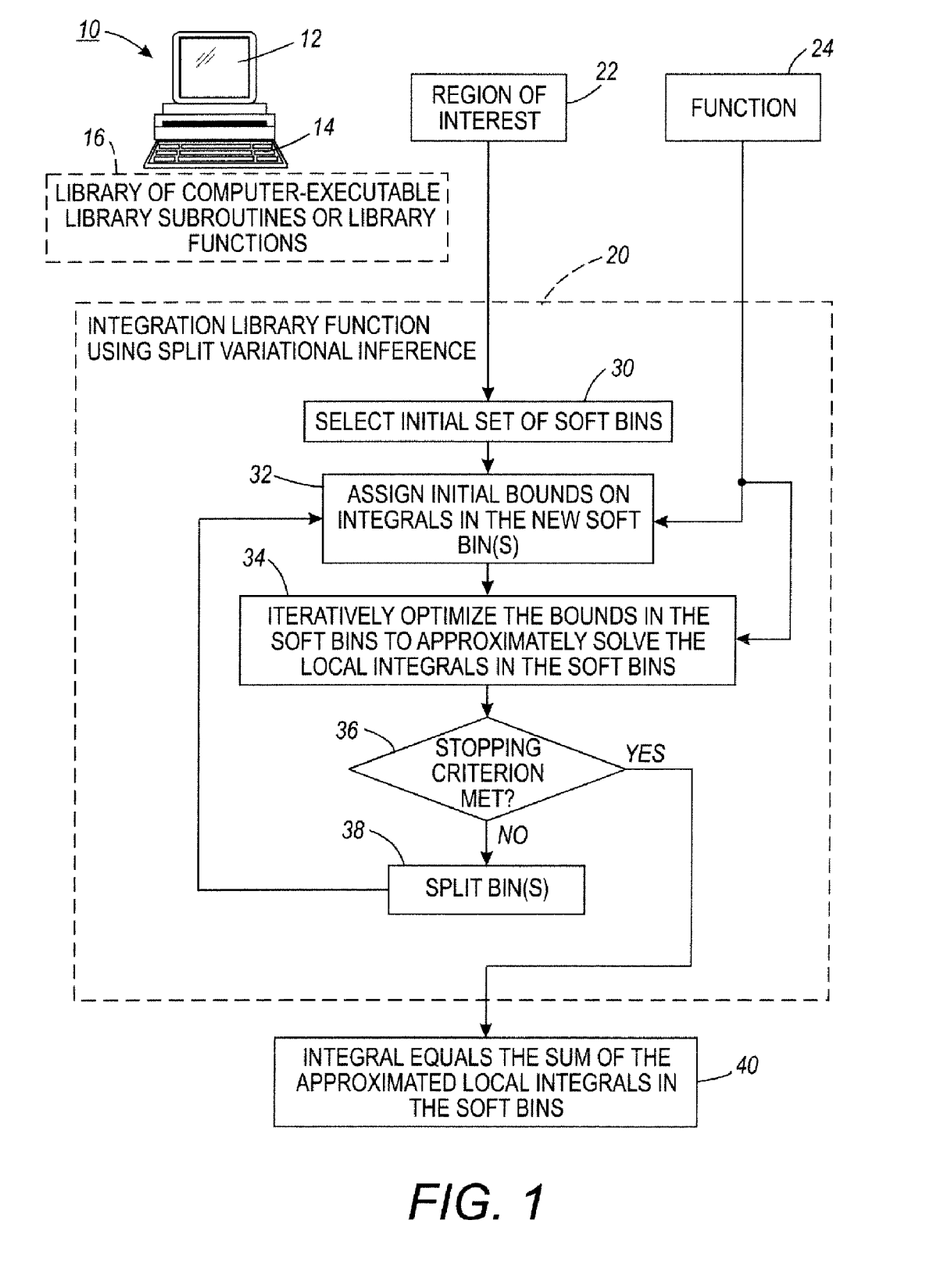
FIG. 1 diagrammatically shows a digital system including a storage medium storing a library of computer-executable library subroutines or library functions including an integration library function.

With reference to FIG. 1, an digital system includes a computer 10 or other digital processing device that includes a digital processor (not shown). The digital processor can be variously embodied, such as by a single-core processor, a dual-core processor (or more generally by a multiple-core processor, a digital processor and cooperating math coprocessor, a digital controller, or so forth. The illustrated computer 10 is a desktop or laptop computer including a display 12 and a keyboard 14. Other interfacing devices, such as a second monitor, a mouse or trackball, or so forth can also be included. On the other hand, the illustrated computer 10 can be replaced by another digital processing device such as a network server having only network interfacing (for example, Internet or local area network (LAN) interfacing), or so forth.

The computer 10 or other digital processing device includes or has access to a storage medium (not shown) that stores a library of computer-executable library subroutines or library functions 16. The storage medium may be, for example: a hard disk or other magnetic storage medium; an optical disk or other optical storage medium; a random access memory (RAM) chip or set of RAM chips; a read-only memory (ROM) chip or set of ROM chips; a FLASH memory; or so forth. The storage medium may also be a server-based storage medium such as a redundant array of inexpensive or independent disks (RAID) that is indirectly accessed by the computer 10 via a digital network. The library of computer-executable library subroutines or library functions 16 includes an integration library function 20 that is configured to receive a region of interest 22 and a function 24 defined over the region of interest. The region of interest can in general be a d-dimensional vectorial space or a subset of it, where d is an integer greater or equal to 1. When executed by the computer 10 or other digital processing device, the integration library function is configured to cause the computer to perform an integration of the function 24 over the region of interest 22. The library 16 may be a general purpose library including subroutines and/or functions having a diversity of purposes, or may be a more specialized library such as being a mathematical library including subroutines and/or functions limited to mathematical applications, or so forth.

Integration functionality is disclosed herein as embodied by a storage medium storing the library 16 including the integration library function 20, and as execution of the integration library function 20 by the digital processor of the computer 10. However, the disclosed integration functionality can be otherwise embodied, for example as a digital processor (such as the digital processor of the computer 10) that is programmed or otherwise configured to implement the disclosed integration functionality, or as a software function or subroutine that is directly included in application program software (rather than called or invoked from a the library 16), or so forth.

The integration library function 20 computes (or, more precisely, estimates) an integral using a split variational inference technique disclosed herein. It is disclosed herein to evaluate the integral of a positive function (the function 24 in the illustrated embodiment) over the region of interest 22 based on soft-binning functions that smoothly divide the integral over the region of interest 22 into smaller integrals that are easier to approximate. In some embodiments, this soft binning approach, in combination with mean-field approximations for each individual sub-part, leads to a tractable algorithm that alternates between optimization of the soft bins and approximation of the local integrals in the soft bins. Suitable choices for the binning functions are disclosed such that a standard mean field approximation can be extended to a split mean field approximation without reliance upon extra derivations.

With continuing reference to FIG. 1, the integration library function 20 implements the following operations. In an operation 30, an initial set of soft bins is selected that spans the region of interest 22. The term "soft bins" refers to bins that overlap in space. The soft bins collectively span the region of interest 22 in that the soft bins additively combine to equal the region of interest 22. The soft bins "overlap" in that a single point in the region of interest 22 may belong to two or more (up to possibly all) of the soft bins with the contribution to each soft bin being defined by a weight.

In an operation 32, initial bounds on the integral in each soft bin is assigned. The initial bound can in general be a lower bound, an upper bound, or both a lower bound and an upper bound. For a lower bound, the integral of the function 24 over the soft bin is assured to be greater or equal to the value of the lower bound. For an upper bound, the integral of the function 24 over the soft bin is assured to be less or equal to the value of the upper bound. If both a lower bound and an upper bound are used, then the value of the integral of the function 24 over the soft bin is known to lie between the lower and upper bounds. In an operation 34, the bounds in the soft bins are iteratively optimized to approximately solve the local integrals in the soft bins.

Assuming a stopping criterion 36 is not met, the processing performed by the integration library function 20 continues by splitting at least one existing soft bin to create two smaller new soft bins in an operation 38. This operation entails dividing at least one existing soft bin into two smaller soft bins. In a suitable approach, a single existing soft bin is divided into two smaller soft bins that collectively span the original soft bin. The effect of the split is to create at least one new soft bin. Process flow then returns to the initial bound assignment operation 32—however, in this second pass the initial bound assignment operation 32 operates only to assign initial bounds to the new soft bins created by the operation 38. The remaining unmodified soft bins retain their iteratively optimized bounds. Processing then flows to the second pass of the iterative optimizing operation 34. In this second pass, the iterative optimization is optionally applied only to the new soft bins created by the operation 38. Alternatively, in the second pass all soft bins including the unmodified soft bins may be iteratively optimized. The stopping criterion 36 is again checked—if it is not met, a third or further pass is performed so as to continue to subdivide soft bins into smaller soft bins and iteratively optimize the bounds in the new soft bins, until the stopping criterion 36 is met, at which point an output operation 40 outputs the estimate of the integral of the function 24 over the region of interest 22 as equal to the sum of the local integrals in the soft bins.

Having described the integral processing in overview with reference to FIG. 1, additional disclosure including some more detailed embodiments are now further described.

The integral to be computed (or, more precisely, estimated) can be written in equation form as follows:

$$I = \int_\chi f(x)dx, \forall_{x \in \chi} f(x) \geq 0, \quad (1)$$

where $\chi$ denotes the region of interest 22, x denotes a set of parameters or, equivalently, a multi-dimensional variable, and $f(x)$ denotes the function 24. It is to be understood that the region of interest $\chi$ 22 and the corresponding parameter or variable x are in general multidimensional, and may in general include two dimensions, three dimensions, four dimensions, five dimensions, a dozen dimensions, or even higher number of dimensions. In consequence, the function $f(x)$ may in general have a complex topology with various numbers of nodes in the multidimensional region of interest $\chi$ 22.

The soft bins selected in the operation 30 and iteratively expanded in the soft bin division operation 38 are represented herein as a set of soft bins $S = \{s_1, s_2, \ldots, s_K\}$, such that the function $f(x)$ 24 can be split into K functions that individually are easier to approximate. The parametric functions $s_k : \chi \times \beta | \to [0,1]$ are binning functions on the space $\chi$ if the following condition holds:

$$\forall_{x \in \chi, \beta \in B} \sum_{k=1}^{K} s_k(x; \beta) = 1. \quad (2)$$

Using such binning functions, the integral of Equation (1) can be written in terms of K integrals as follows:

$$I = \sum_{k=1}^{K} I_k(\beta), \quad (3)$$

where $$I_k(\beta) = \int_\chi s_k(x; \beta) f(x) dx. \quad (4)$$

To estimate the integral I, various forms of $s_k$ can be chosen and various methods can be used to approximate the local integrals $I_k(\beta)$.

The skilled artisan will recognize that if the soft bins $s_k$ are replaced by hard rectangular bins and the local integrals are approximated by constant functions, then Equations (3) and (4) can be converted to represent the conventional Riemann sum integration approach. However, because Equations (3) and (4) employ soft bins $s_k$, the approach of Equations (3) and (4) is substantially more flexible and tractable for computing an integral in which the function $f(x)$ 24 is complex multidimensional and possibly multimodal. Moreover, unlike the Riemann sum approach, the integration of Equations (3) and (4) provides the parameter $\beta$ which makes it possible, as disclosed herein, to improve the integral estimate by optimizing over the soft binning.

In the illustrative embodiments, the optimization operation 34 employs bounds $\underline{I}_k(q_k, \beta) \leq I_k(\beta)$ with variational parameters $q_k$. Bounds allow the use of coordinate ascent style algorithms to optimize both over $\beta$ and the variational parameters $q_k$. Further, bounds ensure guaranteed improvements as the number of bins K is increased by the bin splitting operation 38.

The split variational inference method for estimating the integral of Equation (1), as disclosed herein, is a generally applicable method and can utilize either lower bounds or upper bounds or both. In some illustrative embodiments set forth herein, the split variational inference method is employed in combination with mean-field techniques. Using mean field bounds, the local integrals $I_k$ can be lower bounded using standard mean filed approximations. The mean field bound can be derived based on the observation that the Kullback-Leibler (KL) divergence between two distributions p and q, given by:

$$KL(p\|q) = \int_\chi p(x) \log \frac{p(x)}{q(x)} dx, \quad (5)$$

is never negative, and is equal to zero if and only if p=q. The space $\chi$ denotes the region of interest. Using a KL divergence as a slack term with variational parameters $q_k$ yields the following:

$$I_k(\beta) \geq I_k(\beta) \times \exp\left(-KL\left(q_k \| \frac{f_k(x; \beta)}{I_k(\beta)}\right)\right) \quad (6)$$

$$= \exp\left(-\int_\chi q_k(x) \log \frac{q_k(x)}{s_k(x; \beta) f(x)}\right)$$

$$\equiv \underline{I}_k(\beta).$$

The inequality set forth in Equation (6) is of a type known as a Jensen inequality. The KL slack term ensures that the bound is tight in the sense that if no further restrictions are placed on Q, the family from which $q_k$ is chosen, so that $q^*_k(x) = f(x)s_k(s) | I_k$ for every $\epsilon \chi$ the bound touches. This also implies that if it is assumed that the original integral as set forth in Equation (1) is not tractable to compute, the unrestricted optimization is also not tractable to perform. In conventional mean-field approximations the family Q is restricted to tractable distributions such as fully factorized distributions, multivariate Gaussians, or tree structured graphical models.

Some illustrative embodiments of soft bins selection is next considered. A product of sigmoids proves to be a flexible and powerful choice for the soft bins $s_k$. A sigma function $\sigma(x)$ has the form:

$$\sigma(x) = \frac{1}{1 + e^{-x}}. \quad (7)$$

In its simplest form, without the product, two sigmoidal functions:

$$s_1(x;\beta) = \sigma(\beta^T x + \alpha) \quad (8)$$

and $$s_2(x;\beta) = \sigma(-\beta^T x - \alpha) \quad (9)$$

form a binning of the space $\chi$ into two soft bins whose sum equals the complete region of interest $\chi$ 22. This can be seen by recognizing that $s_1(x; \beta) = 1 - s_2(x; \beta)$ or, equivalently, the sum of the soft bins $s_1(x; \beta)$ and $s_2(x; \beta)$ is $s_1(x; \beta) + s_2(x; \beta) = 1$ for all points in the region of interest 22.

Figure 2:
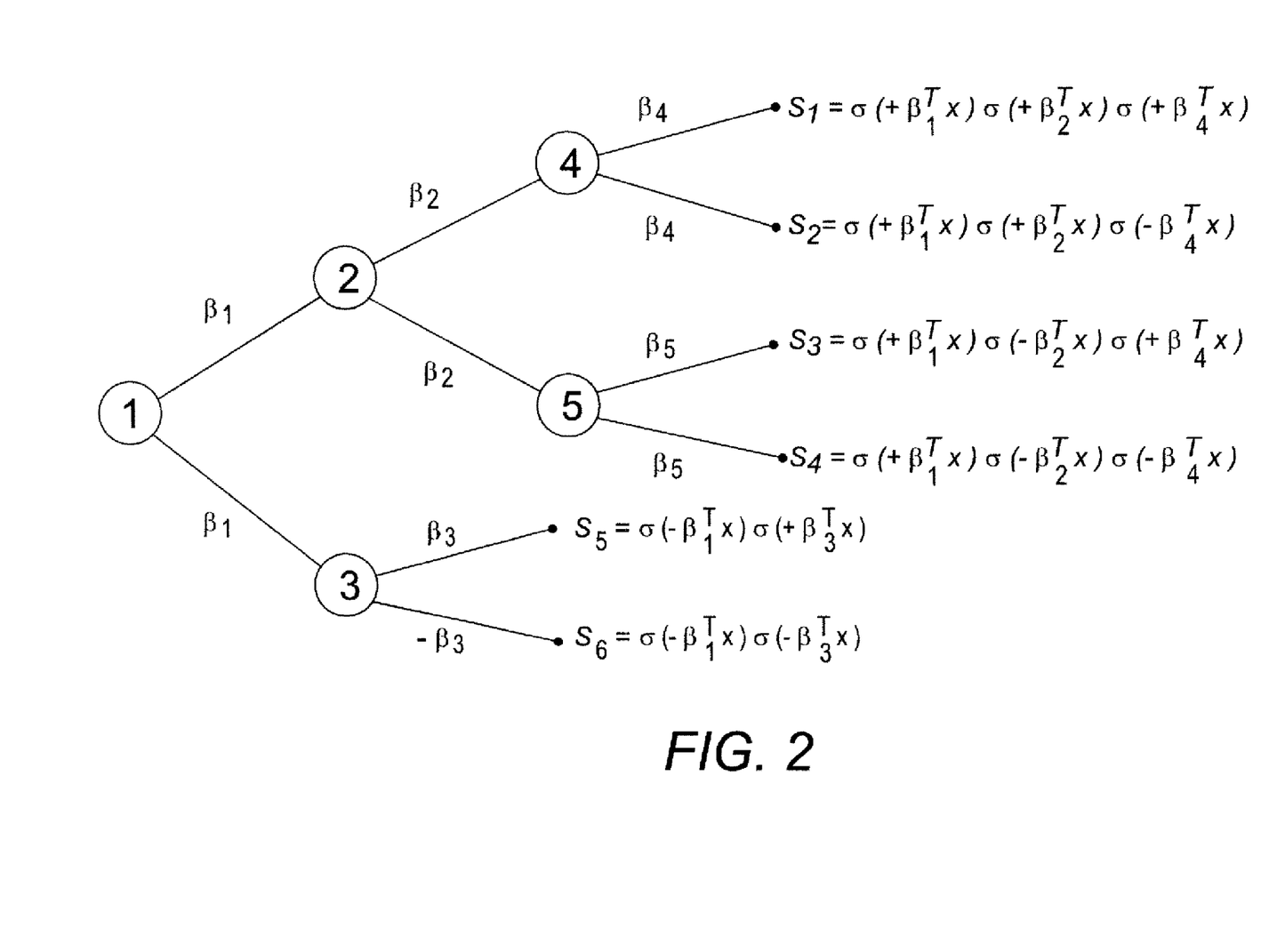
FIG. 2 diagrammatically shows a decision tree suitably used for choosing the soft bin for splitting in one embodiment of the adaptive binning aspect of execution of the integration library function.

With reference to FIG. 2, multiple splits can be obtained by taking products of sigmoids. FIG. 2 diagrammatically shows an example of a soft binning of $\chi$ based on products of sigmoids. The tree ensures that the bins defined by level l are independently sub-divided in level l+1. By organizing the sigmoidal functions into a tree as diagrammatically shown in FIG. 2, a flexible structure for the soft bins is obtained, where soft bin can be split independently. As a comparison, a straightforward use of a product of sigmoids is a special case of the tree construction where all splits in a single level share the same parameters. Formally, each bin $s_k$ in a tree with K leaves is the product of K−1 sigmoidal functions, that is:

$$s_k(x; \beta) = \prod_{l=1}^{K-1} \sigma(d_{kl}(\beta_l^T x + a_l))^{|d_{kl}|}, \quad (10)$$

where $d_{kl} \in \{-1, 0, 1\}$ are constants that follow from the path from the root to leaf k. A simple recursion argument shows that this construction satisfies the binning property $\sum_{k=1}^{K} s_k(x, \beta) = 1$ for any $x \in \chi$ and any $\beta \in B$. Advantageously, the product is transformed into a sum in Equation (6) so that expectations are decoupled.

For the embodiment employing products of sigmoids as the soft bins, and the Jensen inequality of Equation (6) as a bound for approximating the local integral in each soft bin, the processing performed by the integration library function 20 of FIG. 1 can be represented by the following algorithm (referenced herein as "Algorithm 1" or as the "Split Mean Field" algorithm):

```
q = InitializeFactoredDistributions
do
    β = OptimizeBins(q,β)
    for k = 1,...,K
        q_k = UpdateBound(f,s(·,β),q_k)
    end
while I_k(β,q_k) not converged
```

The general split mean field algorithm set forth in Algorithm 1 can be used in various cases. Algorithm 1 can be adjusted to accommodate specific characteristics of the function $f$ 24 and chosen trade-offs between speed and accuracy. Some examples of such variations of Algorithm 1 in various cases is set forth next.

The first considered class of cases are continuous spaces $\chi = R^D$. For the illustrative examples of these cases set forth herein, Gaussian mean field approximations are used. Considering the Jensen inequality of Equation (6), it is seen that evaluation of the lower bound entail evaluation of $<\log s_k(x; \beta)>_{q_k(x)}$ and $<\log f(x)>_{q_k(x)}$. The brackets $<>$ denote expectations over the distribution given in lower indices. If these integrals and the derivatives with respect to their (variational) parameters can be computed, then the lower bound can be optimized using a suitable unconstrained gradient based method such as the Broyden-Fletcher-Goldfarb-Shanno (BFGS) method. Since $s_k$ and $f$ appear as separate terms in the Jensen inequality of Equation (6) due to the log they can be considered one by one. For some instances of the function $f$ 24, these expectations and derivatives can be computed analytically. For example, such analytical computation is possible if the function $f$ 24 is Gaussian and for Gumbel, the function $$x \to \exp\left(-\frac{1}{20}x^2 + \sin(x)\right)$$

and products of sigmoids. For some other classes of the function $f$ 24 useful Gaussian lower bounds are known based on local variational parameters $\eta$, for example:

$$\underline{f}(x; \eta) \equiv \exp\left(-\frac{1}{2}x^T A(\eta)x + b(\eta)^T x + c(\eta)\right) \leq f(x). \quad (11)$$

This is the case, for example, in general for many heavy-tailed distributions. If Gaussian lower bounds to $f(x)$ are used, additional coordinate ascent steps are suitably made in $\eta$.

The second term to evaluate is $<\log s_k(x; \beta)>_{q_k(x)}$. With the choice of $s_k$ as a product of sigmoids it is sufficient to consider the case of a single sigmoid again due to the log in the Jensen inequality of Equation (3). One way to proceed is to construct special functions which correspond to 1D integrals:

$$\gamma(\mu, \sigma) = \int N(x; \mu, \sigma) \log \frac{1}{1 + e^{-x}} dx \quad (12)$$

$$\nabla_\mu \gamma(\mu, \sigma) = \int \frac{d}{d\mu} N(x, \mu, \sigma) \log \frac{1}{1 + e^{-x}} dx$$

$$\nabla_\sigma \gamma(\mu, \sigma) = \int \frac{d}{d\sigma} N(x; \mu, \sigma) \log \frac{1}{1 + e^{-x}} dx,$$

either by tabulating or finding solutions akin to the numerical approximation of the erf function. The Gaussian family is closed under linear transformations, which implies that a special function which takes only two parameters suffices for the problems where there are two relevant parameters in $q_k$ and two in $\beta$.

If D is of medium size, that is, such that inverting a D×D matrix is feasible, then the Gaussian variational distributions $q_k$ can have a full covariance matrix. For larger D, to obtain a tractable distribution the $q_k$ parameters can be restricted to fully factorized distributions according to $q_k = \Pi_{d=1}^{D} q_{kd}(x_d)$ or to form tree structured models.

In the foregoing, the optimization problem factorizes by construction and the derivations and implementations required to handle the binning functions $s_k$ are independent of the form of the function $f$ 24 and can be done once. That means that if there already is a standard Gaussian mean field approximation for the function $f$ 24 then no additional computation is needed.

In an alternative treatment of the soft bins $s_k$, instead of evaluating $<\log s_k(x; \beta)>_{q_k(x)}$ exactly and employing gradient steps, it is instead possible to construct a Gaussian lower bound on $s_k$. A useful Gaussian lower bound to the logistic sigmoid for this purpose is based on the observation that the log is upper bounded by any of its tangents. For the product of sigmoids in $s_k$ this gives a tractable lower bound. The obtained lower bound is a Gaussian potential: its precision matrix is of rank at most K−1 and its scaling factor is such that it is below the product of sigmoids everywhere.

In the case of a Gaussian lower bound on $s_k$ and a Gaussian lower bound or exact Gaussian $f(x)$ closed form updates are obtained for all parameters in a coordinate ascent algorithm.

This makes it possible to work with very high numbers of soft bins (that is, large values of K where K represents the number of soft bins). Using a second underline in the mathematical notation to denote the introduction of additional local variational parameters, the integral to be optimized can be expressed as:

$$\underline{\underline{I}}(\beta, \eta, \xi, \{q_k\}) = \sum_{k=1}^{K} \exp\left(-\int_{\chi} q_k(x) \log \frac{q_k(x)}{\underline{\underline{s_k}}(x; \xi, \beta) \underline{f}(x; \eta_k)} dx\right). \quad (13)$$

Update of β can be performed as follows. The Gaussian lower bound $s_k$ is a product of Gaussian potentials. The log in Equation (13) allows each Gaussian lower bound $s_k$ to be treated each independently. On inspection of Equation (13) and the Gaussian form of the Gaussian lower bound $s_k$ it is observed that the optimization problem with respect to parameters ($\beta_l$, $\alpha_l$) for a single Gaussian potential, with all other parameters fixed, is an unconstrained quadratic function. The optimization of η is just as for β an unconstrained quadratic optimization problem. A closed form solution for ξ exists as well. See, for example: Jaakkola et al., "A variational approach to Bayesian logistic regression problems and their extensions", in Proceedings of the Sixth International Workshop on Artificial Intelligence and Statistics (1996). Update of the parameters $q_k$ can be performed based on the observation that Equation (13) has a KL form. Hence $q_k$ is minimized by taking $s_k f_k$. If $q_k$ is restricted to be a fully factorized distribution similar arguments pertain for each of the marginals $q_{kd}$.

If $s_k$ is lower bounded, but $f_k$ is non-linear, then optimization of β and ξ can be performed in closed form as outlined above, but with the optimization with respect to $q_k$ employing gradient based methods.

The binned mean field algorithms disclosed herein are not limited to a continuous region of interest χ 22. Rather, the region of interest χ 22 can also be discrete in nature. In a discrete setting, the integral of Equation (1) is interpreted as a high-dimensional sum. In this case, useful bounds can be obtained based on factorized discrete distributions:

$$q_k(x) = \prod_{i=1}^{d} \prod_{j=1}^{M} \pi_{i,j}^{x_{i,j}}, \quad (14)$$

where $x_{i,j} \in \{0,1\}$ and $\Sigma_j x_{i,j} = 1$ for all variable i, and $\pi_{i,j}$ are the variational parameters (in the simplex).

Some additional examples are set forth next, which employ a combination of upper and lower bounds to estimate the local integrals. In these examples upper and lower bounds are constructed to the integral of Equation (1) and to the marginals:

$$f(x_i) = \int_{\chi \setminus \chi_i} \frac{f(x)}{I} dx. \quad (15)$$

Using K binning functions $s_k : \chi | \to [0,1]$ with the condition for the $s_k$ parameters to be soft bins, that is:

$$\sum_{k=1}^{K} s_k(x) = 1 \forall x \in \chi. \quad (16)$$

The integral is split into K focused integrals as in Equation (4). The local integrals are then upper and lower bounded by upper and lower bounding each focused integral $I_k$. The lower bound is suitably represented as:

$$\underline{I_k} \leq I \forall k \in 1, \ldots, K \quad (17).$$

The upper bound is suitably represented as:

$$\overline{I_k} \geq I \forall k' \in 1, \ldots, K' \quad (18).$$

The complete integral of Equation (1) is bounded as follows:

$$\underline{I} = \sum_{k=1}^{K} \underline{I_k} \leq I \leq \sum_{k'=1}^{K'} \overline{I_k} = \overline{I}. \quad (19)$$

The binning functions for the lower bound and the binning functions for the upper bound can be chosen to be the same, but they need not be, as indicated by the use of unprimed and primed indices k∈1, . . . , K and k'∈1, . . . , K' respectively in Equations (17)-(19).

The approach employing both upper and lower bounds is general, and any suitable choice for the lower and upper bounds of $I_k$ can be used. The lower bounds based on mean field theory already discussed can be used for $\underline{I_k}$ in Equation (17). A suitable choice for the upper bounds $\overline{I_k}$ of Equation (18) is power EP with a suitable choice for the powers, as described for example in Minka, "Divergence measures and message passing", Technical report MSR-TR-2005-173, Microsoft Research (2005). The method is also general in the sense that any choice for the soft bins $s_k$ can be used, as long as they satisfy the binning property of Equation (16) (or, equivalently, Equation (2)). The method proceeds by finding the optimal set of binning functions, and upper and lower bounds within the chosen families.

In some embodiments, the hierarchical approach for selecting and splitting soft bins $s_k$ is used with a set of binning functions that includes the constant function $s_k(x)=c$. In this case an approximation based on K bins can be extended to an approximation using K+1 with a guaranteed improvement in the bound. This can even be done if local search methods are used to optimize the binning functions and bounds, and only local optima of the objective function can be guaranteed. This property can be obtained by expanding a leaf node with two child nodes with a constant "binning" function at 0.5. A local (and clearly also a global) iterative improvement procedure will move away from this point if and only if the bounds can be improved.

The method yields upper and lower bounds on I with an ever decreasing gap as K is increased.

The computation of the partition function I and marginals $f(x_i)$ are closely related. Various methods are available for finding bounds on marginals based on bounds on the partition function.

A use for upper and lower bounds to integral I in the context of model evidence in machine learning applications and marginals $f(x_i)$ is in critical decision support systems. In these cases the model $f(x)$ represents the complex, stochastic, relationships between variables in a particular domain such as printer status monitoring, or patient health diagnosis. A popular framework for constructing such systems is that of Bayesian Networks or Graphical Models, where the integral evaluation techniques disclosed herein are useful.

If the diagnosis system is used to aid in the making of important decisions (for example, to make a decision about an expensive maintenance operation on a printer or a complicated operation with possible side effects on a human patient), an approximate inference method with guaranteed worst case approximations is to be preferred over approaches with arbitrary approximations: in these settings of typically asymmetric costs the decision maker wants to go for short term savings only if the possibility of extreme events (break down or death in the examples above) is guaranteed to be small.

Thus, bounds on evidence and marginals have substantial advantages. The split variational inference approach for evaluating the integral of Equation (1), as disclosed herein, provides for a very general class of problems not only an approximation, but also a guarantee about the accuracy of the approximation.

Some applications of the integration library function 20 are next illustrated as examples.

Figure 3:
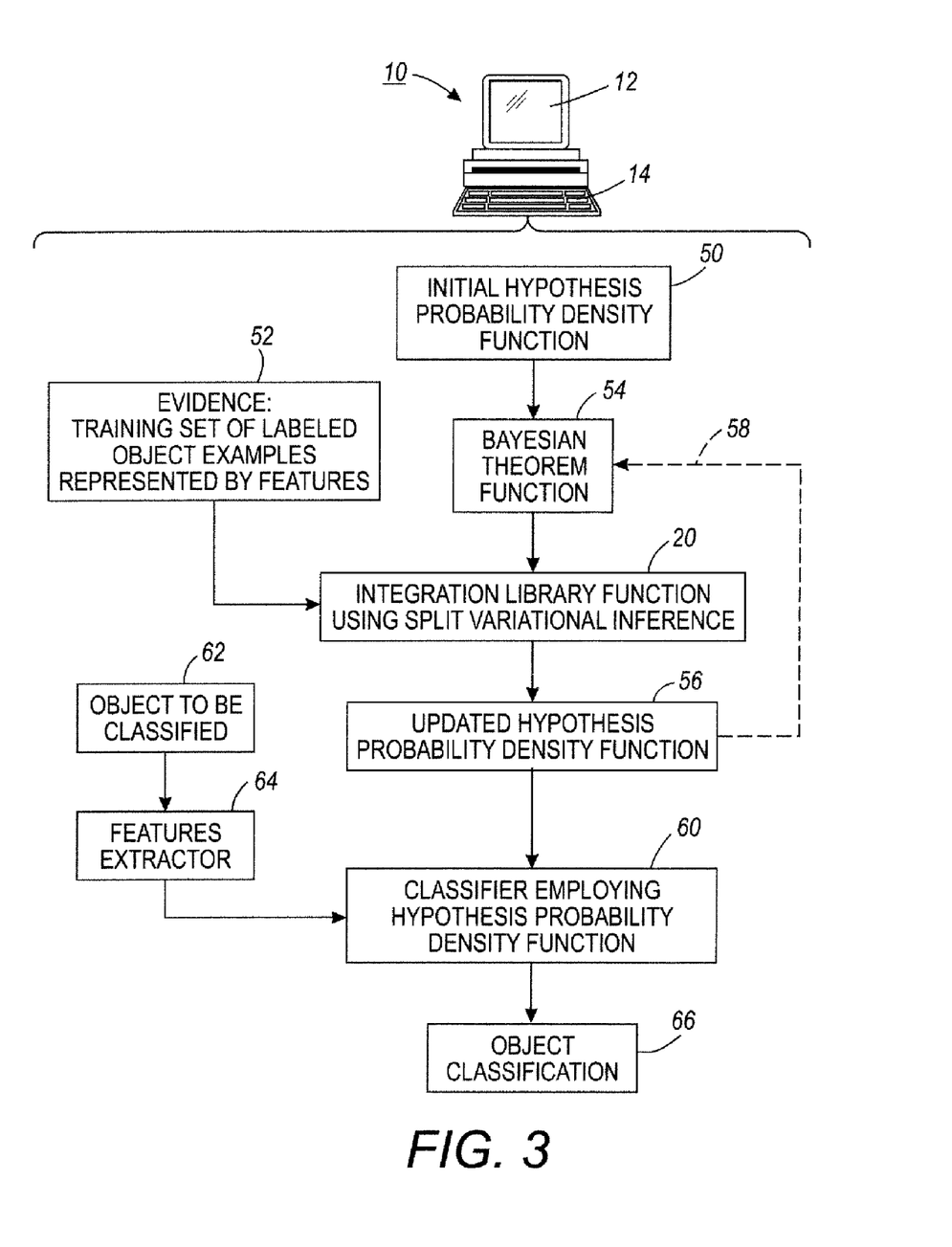
FIG. 3 diagrammatically shows a classifier that employs Bayesian inference for training a hypothesis probability density function that is used by the classifier in performing classification operations, wherein the Bayesian inference employs the integration library function of FIG. 1.

With reference to FIG. 3, a classifier that is trained using Bayesian inference is described. Bayesian inference improves upon an initial hypothesis H suitably represented by a probability density function P(H) based on evidence denoted herein as E using an iterative adjustment of the form:

$$P(H)^{(n+1)} = P(H|E) = \frac{P(E|H)}{P(E)} \cdot P(H)^{(n)}. \quad (20)$$

The probability $P(H)^{(n)}$ is referred to as the prior probability, that is, the probability prior to taking into account the evidence E. The probability $P(H)^{(n+1)}=P(H|E)$ is referred to as the posterior probability, that is, the adjusted probability after taking into account the evidence E. The fraction in Equation (20) ratios the probability of the evidence E if the hypothesis H is true (that is, the conditional probability P(E|H)) against the probability of the evidence E without the limiting hypothesis H (that is, the marginal probability P(E)). A high ratio value indicates the evidence E strongly supports the hypothesis H and hence makes $P(H)^{(n+1)}>P(H)^{(n)}$, whereas a low ratio value indicates the evidence E strongly contradicts the hypothesis H and hence makes $P(H)^{(n+1)}<P(H)^{(n)}$. For the classifier application of FIG. 3, the initial hypothesis H (also denoted herein as $p_0$) corresponds to an initial (untrained) soft classifier model 50, and the evidence E corresponds to a training set 52 of labeled object examples represented by features vectors, used to train the classifier. The objects may be of substantially any type for which the classifier is being trained, such as document objects, image objects, or so forth. The elements of the features vectors can in general be any quantitative aspect of the objects that is likely to be discriminative for classifying the object respective to classes of interest. For example, in the case of document objects the features may be discriminative words, page layout aspects, or so forth. For image objects, the features may be vectors of image characteristics extracted from image portions or patches. Features selection is not shown in FIG. 3, but may for example employ manual feature selection, automatic feature selection, use of feature reduction algorithms such as principle component analysis (PCA), or so forth.

The training process applies a Bayesian theorem function 54 given in Equation (20) (or a variant thereof) in an iterative fashion to adjust the initial classifier 50 based on the evidence comprising the training set 52. The Bayesian theorem function 54, also sometimes referred to as the Bayesian a posterior function, corresponds to an unnormalized distribution, that is, a distribution up to a normalizing factor. The training process computes the normalizing factor.

In a suitable approach, a logistic regression model p(y|x, θ)=σr(yθ$^T$x) is used for training the classifier model θ, where x∈R$^D$ is the input vector representing the feature vectors having dimensionality D and y∈(−1,1) is the annotated output label (that is, the classification label). Thus, the pair (x,y) represents an item of evidence comprising the features vector x for an object and its pre-annotated classification label y. The goal is to have an accurate approximation of the posterior distribution whose normalization factor is a D-dimensional integral:

$$I = \int_\Theta p_0(\theta) \prod_{i=1}^{n} p(y_i | x_i, \theta) d\theta. \quad (21)$$

For every dataset, the parameters of the Gaussian prior $p_0$ are chosen using a simple heuristic: on half of the dataset randomly build 100 datasets (with replication) of 10 data points. For each of these small datasets, the MAP estimator of the logistic regression are learned with unit-variance prior. Finally, the mean and variance of $p_0$ are set to the empirical mean and variance of the estimators. On the second half of the dataset, 10 observation points are randomly chosen for the likelihood $\Pi_{i=1}^{n} p(y_i|x_i, \theta)$. The integral I is therefore a product between a Gaussian and 10 sigmoids, which as diagrammatically shown in FIG. 3 can be approximated using the integration library function 20 to produce an updated classifier 56 comprising an updated hypothesis probability density function $H^{(n+1)}$. Advantageously, further updating of the classifier can be performed as additional evidence (e.g., additional training samples) becomes available, as diagrammatically indicated in FIG. 3 by a dashed arrow 58.

The result of the training is a trained classifier 60 employing the final updated hypothesis probability density function. An object 62 to be classified (that is, which is not pre-annotated with a classification label or labels) is processed by a features extractor 64 to generate a features vector representing the object 62, which features vector has the same selection and ordering of features as the features vectors representing the objects of the training set 52. The features vector representing the object 62 is input to the trained classifier 60, which outputs a class label 66 for the object 62.

Figure 4:
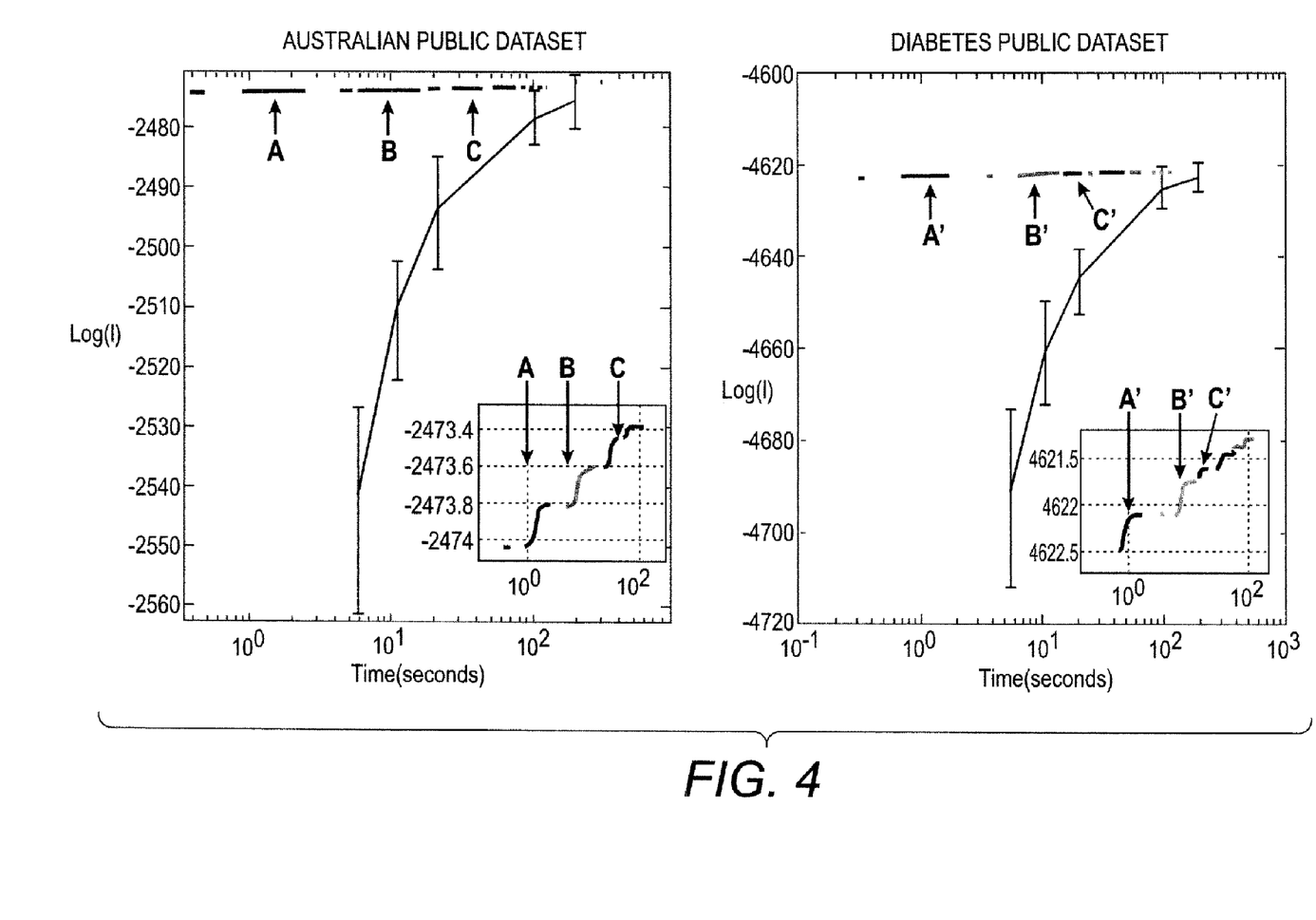
FIG. 4 plots illustrative results for classifier training performed using Bayesian inference as described with reference to FIG. 3.

With reference to FIG. 4, a classifier constructed in accordance with the Bayesian training set forth herein with reference to FIG. 3 was used to train a classifier for a medical test. For comparison, the integral of the Bayesian training was separately evaluated using the known approach of annealed importance sampling (AIS), see e.g. Neal, "Annealed Importance Sampling", Statistics and Computing vol. 11 pages 125-39 (2001). FIG. 4 plots Bayesian logistic regression computation on Australian (left plot; 13 dimensions) and Diabetes (right plot; 9 dimensions) datasets. The vertical (ordinate) axis indicates the value of the log of the integral I of Equation (21) for the respective dataset, and the continuous line indicates log(I) evaluated using the split mean-field technique disclosed herein. The horizontal (abscissa) axis is computation (CPU) time in seconds. The error bars indicates the 80% confidence interval generated by the comparison AIS integration technique. The points indicate the values of the split mean field bound. In the main plot these points show up almost as a horizontal line due to the relatively large vertical (ordinate) axis range; the inset in the lower right of each plot shows the split mean field bound data points with an expanded horizontal (ordinate) axis range. In this plot the discontinuities correspond to the soft bin split operation 38 (see FIG. 1). For the Australian dataset, three regions A, B, C are labeled correspond to three computation regions each terminated by execution of an iteration of the soft bin split operation 38. Similarly, for the Diabetes dataset three regions A', B', C' are labeled correspond to three computation regions each terminated by execution of an iteration of the soft bin split operation 38.

It is seen that during the first iterations, the evaluation of the integral by AIS is inaccurate compared to split mean-field which gives very stable values with a constant improvement over time. Asymptotically, the AIS tends to an unbiased estimate of the integral, that is larger than the best value generated by the split mean field algorithm. As shown in the insets of FIG. 4, there is a relative bound improvement of $0.7 \approx \log(2)$ in the Australian dataset, and a relative bound improvement of $1.2 \approx \log(3)$ in the Diabetes dataset, which indicates that the integral given by split mean field is two to three times larger than the standard mean-field approach. Such differences are likely to create strong biases in the estimates of the Bayes factor when doing model selection.

As indicated in FIG. 3, the classifier including Bayesian training can be implemented on the same computer 10 on which is implemented the library 16 including the integration library function 20. Optionally, instead of accessing the integration library function 20 as illustrated in FIG. 3, the Bayesian classifier training algorithm can incorporate the functionality of the integration library function 20 in the executable module implementing the Bayesian classifier training algorithm. As another alternative, the module implementing the Bayesian classifier training algorithm (and, optionally, the module implementing the trained classifier) may execute on a different computer than the computer that implements the integration library function 20 or equivalent integration functionality.

Figure 5:
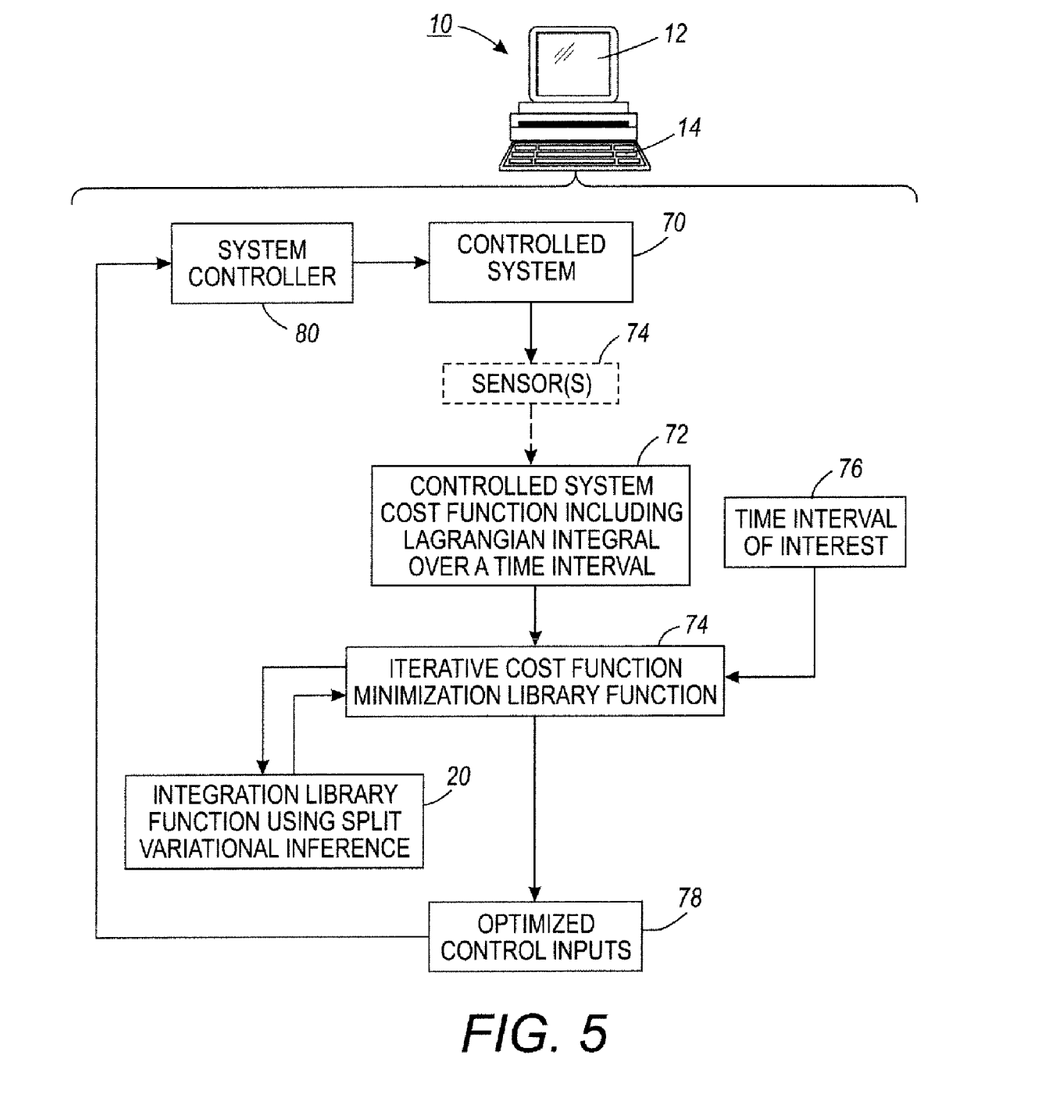
FIG. 5 diagrammatically shows a controlled system and a system controller implementing optimal control that employs the integration library function of FIG. 1

With reference to FIG. 5, another illustrative application of the integration library function 20 is described. This application is optimal control of a controlled system 70. Optimal control employs a mathematical optimization to estimate one or more control inputs that optimize a cost function. For example, the cost function for a controlled mobile system that is to be controlled to go from an initial location $x(t_0)$ at an initial time $t_0$ to a final location $x(t_f)$ at a final time $t_f$ may be of the form $$C(t_0, x(t_0), t_f, x(t_f)) = C_f(t_f, x(t_f)) + \int_{t_0}^{t_f} C_\Delta(x(t), u(t)) dt, \quad (22)$$

where u(t) denotes the control input (which may in general be a function of time), the function $C_f$ denotes the cost of the final location (which may in general be different for different control inputs), and the function $C_\Delta$ denotes an instantaneous cost associated with a given position and given control input. For example, the cost function may quantify fuel efficiency for an automobile trip to a fixed final location at a fixed destination time (in which case $C_f$ is a fixed value that is not optimized), the control input u(t) denotes instantaneous value of the accelerator, and the function $C_\Delta$ denotes instantaneous fuel consumption such that a higher time-integrated fuel consumption is deemed to be a higher cost. The goal is to minimize the integral of Equation (22) respective to the control input u(t), so as to select the "best" acceleration profile for the trip in order to minimize fuel consumption.

In another example, the controlled system may be a roll-to-roll spooled product processing system, and the control inputs are controlled rotational speeds for a feed spool and a take-up spool, and the cost function can measure various desired factors such as maintaining a constant speed for the unrolled product during its transit through a processing region, maximizing speed for processing a roll from the feed spool to the take-up spool, or so forth.

The foregoing are illustrative examples—more generally, optimal control entails integration of an instantaneous cost over time with respect to a control input, which in general varies with time. The cost function can measure various controlled system aspects that are to be optimized (for example, minimizing an input such as fuel, maximizing an output such as a manufacturing process output, optimizing an internal system parameter such as rotor wear, or so forth).

With continuing reference to FIG. 5, optimal control includes a controlled system cost function 72 that characterizes the controlled system 70. The controlled system cost function 72 may optionally be updated continuously or at discrete intervals based on system information provided by one or more sensors 74 that measure aspects of the controlled system 70. An iterative cost function minimization library function 74 (which may, for example, also be part of the library 16 of FIG. 1) minimizes the controlled system cost function 72 respective to the control input (or vector of control inputs) suitably denoted u over a time interval of interest 76. The iterative minimization entails evaluation of the controlled system cost function 72 for values of the control input u. Such evaluation requires estimating the value of the integral over the time interval of interest 76, such as for example evaluating the integral of Equation (22) over the time interval $(t_0, t_f)$. In a typical iterative minimization employing a technique such as gradient descent or the Marquardt least squares minimization algorithm, the cost function 72 undergoing minimization is evaluated for different values of the control input u so as to estimate the local direction and rate of change of the cost function 72 in the parameter space defined by the control input u, and based on this the control input u is updated to move toward values expected to yield a lower value of the cost function 72, and this process is repeated until a minimum (which may be a local minimum) of the cost function 72 is reached.

The output of the iterative cost function minimization library function 74 is the value of the control input u (which, again, may be a vector of control inputs) that defines optimized control inputs 78. A controller 80 controls the controlled system 70 using the optimized control inputs 78. In the foregoing vehicle example the controller 80 may control the vehicle accelerator in accordance with the optimized accelerator control input, while in the foregoing roll-to-roll processing example the controller 80 may control rotary motors driving the feed and pick-up rolls in accordance with optimized roll speed control inputs to control movement of the unrolled product during its transit through a processing region.

As indicated in FIG. 5, the optimal control can be implemented on the same computer 10 on which is implemented the library 16 including the integration library function 20 and, optionally, the cost function minimization library function 74. Optionally, instead of accessing the integration library function 20 and/or the cost function minimization library function 74 as illustrated in FIG. 5, the optimal control can incorporate the functionality of one or both of these library functions 20, 74 in the executable module implementing the optimal control. As another alternative, the module implementing the optimal control may execute on a different computer than the computer that implements the integration library function 20 or equivalent integration functionality.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   partitioning a region of interest into a plurality of soft bin regions that span the region of interest;
   estimating an integral over each soft bin region of a function defined over the region of interest; and
   outputting a value equal to or derived from the sum of the estimated integrals over the soft bin regions spanning the region of interest.

2. The method as set forth in claim 1, further comprising:
   after the estimating, iteratively adjusting the partitioning to increase the number of soft bin regions and repeating the estimating over the increased number of soft bins until a stopping criterion is met.

3. The method as set forth in claim 2, wherein each iteration of the estimating uses the estimated integrals of the previous iteration of the estimating as initial values.

4. The method as set forth in claim 2, wherein the soft bin regions are defined by products of sigmoid functions and the adjusting comprises:
   splitting a selected soft bin region defined by a product of sigmoid functions into two smaller soft bin regions each defined by a product of sigmoid functions in which the two smaller soft bin regions together span the selected soft bin region.

5. The method as set forth in claim 2, wherein the adjusting comprises:
   splitting a selected soft bin region into two smaller soft bin regions that together span the selected soft bin region wherein the splitting is performed in accordance with a binary decision tree defining the soft bin regions.

6. The method as set forth in claim 5, wherein each iteration of the estimating uses the estimated integrals of the previous iteration of the estimating as initial values and the estimating updates the estimated integrals only for the two smaller soft bin regions generated by the splitting.

7. The method as set forth in claim 1, wherein the estimating comprises:
   iteratively adjusting bounds on the integrals over the bin regions such that the bounds are adjusted closer to the corresponding integrals.

8. The method as set forth in claim 7, wherein the bound on the integral over each bin region is selected from a group consisting of: (1) a lower bound, (2) an upper bound, and (3) an upper bound and a lower bound.

9. The method as set forth in claim 7, wherein the bound on the integral over each bin region is defined by a Jensen inequality.

10. The method as set forth in claim 1, wherein the estimating comprises:
    estimating the integrals over the bin regions using a mean field approximation independently applied in each bin region.

11. The method as set forth in claim 1, wherein the soft bin regions are defined by products of sigmoid functions.

12. The method as set forth in claim 1, further comprising:
    performing Bayesian machine learning by integrating a Bayesian theorem function using the partitioning, estimating, and outputting operations in order to compute a normalizing factor wherein the outputting operation outputs an updated hypothesis probability density function; and
    classifying an object to be classified using a classifier employing the updated hypothesis probability density function.

13. The method as set forth in claim 1, further comprising:
    constructing for a controlled system a controlled system cost function including control inputs and an integral over time;
    iteratively minimizing the controlled system cost function to determine optimized control inputs, the iterative minimizing including evaluating the controlled system cost function for selected control inputs over the time interval of interest by performing the partitioning, estimating, and outputting with the function equal to the controlled system cost function having the selected control inputs; and
    controlling the controlled system using the optimized control inputs.

14. A digital system comprising:
    a digital processor programmed to perform a method as set forth in claim 1.

15. A storage medium storing instructions executable by a computer to perform a method as set forth in claim 1.

16. A storage medium storing a library of computer-executable library subroutines or library functions including an integration library function configured to receive the function and the region of interest and to perform a method as set forth in claim 1 to generate the output of the integration library function.

17. A digital system comprising:
    a digital processor configured to:
        partition a region of interest into a plurality of soft bin regions that span the region of interest,
        estimate an integral over each soft bin region of a function defined over the region of interest,
        iteratively increase the number of soft bin regions and repeat the estimating over the increased number of soft bins until a stopping criterion is met, and
        responsive to meeting the stopping criterion, output a value equal to or derived from the sum of the estimated integrals over the soft bin regions spanning the region of interest.

18. The digital system as set forth in claim 17, wherein the soft bin regions are defined by products of sigmoid functions and the increasing of the number of soft bin regions comprises splitting a selected soft bin region into two smaller soft bin regions each defined by a product of sigmoid functions in which the two smaller soft bin regions together span the selected soft bin region.

19. The digital system as set forth in claim 18, wherein the repetition of the estimating repeats the estimating of the integrals only for the two smaller soft bin regions generated by the splitting.

20. The digital system as set forth in claim 17, wherein the digital processor is further configured to:
    perform Bayesian machine learning using the partition, estimate, iterative increase and repeat, and output operations to integrate a Bayesian theorem function; and classify an object to be classified using a classifier employing a hypothesis probability density function generated by the Bayesian machine learning.

21. The digital system as set forth in claim 17, wherein the digital processor is further configured to:
construct for a controlled system cost function including control inputs and an integral over time;
iteratively minimize the controlled system cost function to determine optimized control inputs, the iterative minimizing including evaluating the controlled system cost function for selected control inputs over the time interval of interest using the partition, estimate, iterative and repeat, and output operations; and
control the controlled system using the optimized control inputs.

\* \* \* \* \*